United States Patent
Dove et al.

(10) Patent No.: US 9,926,198 B2
(45) Date of Patent: Mar. 27, 2018

(54) METHOD FOR MANUFACTURING HIGH PURITY SULFURIC ACID

(71) Applicant: ASIA UNION ELECTRONIC CHEMICAL CORP., Taipei (TW)

(72) Inventors: Curtis Douglas Dove, Kaohsiung (TW); Goang-Cheng Chang, Taipei (TW); Yuen-Ming Kung, Taipei (TW); Hung-Wen Chan, Taipei (TW); Wei-Hsuan Hsu, Taipei (TW)

(73) Assignee: ASIA UNION ELECTRONIC CHEMICAL CORP., Taipei (TW)

( * ) Notice: Subject to any disclaimer, the term of this patent is extended or adjusted under 35 U.S.C. 154(b) by 879 days.

(21) Appl. No.: 14/266,819

(22) Filed: Apr. 30, 2014

(65) Prior Publication Data

US 2014/0326593 A1    Nov. 6, 2014

(30) Foreign Application Priority Data

May 1, 2013    (TW) .............................. 102115629 A
Oct. 23, 2013    (TW) .............................. 102138283 A

(51) Int. Cl.
*C01B 17/88* (2006.01)
*C01B 17/90* (2006.01)
(Continued)

(52) U.S. Cl.
CPC ................ *C01B 17/90* (2013.01); *B01D 3/00* (2013.01); *B01D 3/34* (2013.01); *C01B 17/88* (2013.01);
(Continued)

(58) Field of Classification Search
CPC ....... C01B 17/88; C01B 17/90; C01B 17/901; C01B 17/907; C01B 17/905;
(Continued)

(56) References Cited

U.S. PATENT DOCUMENTS 3,294,650 A * 12/1966 Manteufel ................ B01D 3/00
                                                                159/17.3
5,164,049 A    11/1992 Clark et al.
(Continued)

FOREIGN PATENT DOCUMENTS

CN        1699146 A      11/2005
CN      202829582 U       3/2013
(Continued)

OTHER PUBLICATIONS

"Sulfuric Acid Material Safety Data Sheet", teckcominco, Dec. 15, 2003.*
(Continued)

*Primary Examiner* — Jonathan Miller
*Assistant Examiner* — Jonathan Luke Pilcher
(74) *Attorney, Agent, or Firm* — CKC & Partners Co., Ltd.

(57) ABSTRACT

A method for manufacturing high purity sulfuric acid is provided. A mixed solution subsequently undergoes a first preheating step, a second preheating step, a distilling step and an evaporating step to remove peroxide, water, oxygen and insoluble impurities, so as to obtain the first gas containing sulfur trioxide, sulfuric acid and hydrogen oxide. And then, the sulfur trioxide is absorbed by a sulfuric acid solution, thereby forming the high purity sulfuric acid.

6 Claims, 2 Drawing Sheets

(51) Int. Cl.
*B01D 3/00* (2006.01)
*B01D 3/14* (2006.01)
*B01D 3/34* (2006.01)

(52) U.S. Cl.
CPC .............. *C01B 17/901* (2013.01); *B01D 3/14* (2013.01); *B01D 3/143* (2013.01); *B01D 3/148* (2013.01)

(58) Field of Classification Search
CPC ..... C01B 17/906; C01B 17/908; C01B 17/92; C01B 17/94; B01D 3/143; B01D 53/14; B01D 53/1456; B01D 3/00; B01D 3/14; B01D 3/148
USPC .................................................. 423/522, 531
See application file for complete search history.

(56) References Cited

U.S. PATENT DOCUMENTS

| | | | |
|---|---|---|---|
| 6,508,915 B1 * | 1/2003 | Osuda | B01D 3/42 159/44 |
| 6,740,302 B2 * | 5/2004 | Hostalek | C01B 17/69 423/522 |
| 7,232,504 B2 * | 6/2007 | Osuda | B01D 3/42 202/155 |
| 2002/0192144 A1 * | 12/2002 | Hostalek | C01B 17/69 423/522 |

FOREIGN PATENT DOCUMENTS

| | | |
|---|---|---|
| JP | S50001993 | 1/1975 |
| JP | S56045808 | 4/1981 |
| JP | H06127908 A | 5/1994 |
| JP | H08-073206 A | 3/1996 |
| JP | H08175810 A | 7/1996 |
| JP | H10231107 A | 9/1998 |
| JP | 2003519066 A | 6/2003 |
| KR | 10-0269906 B1 | 10/2000 |

OTHER PUBLICATIONS

W.G. Davenport, M.J.King, B.Rogers, A.Weissenberger, "Sulphuric Acid Manufacture", South African Institute of Mining and Metallurgy, Mar. 5-8, 2006, pp. 1-16.

Yu-Rui Chi, "Inorganic Chemistry," Textbook for Senior Vocational School, Jan. 2006, p. 108, Section 3.(1)&(2).

* cited by examiner

METHOD FOR MANUFACTURING HIGH PURITY SULFURIC ACID

RELATED APPLICATIONS

This application claims priority to Taiwan Application Serial Number 102115629, filed May 1, 2013 and 102138283, filed Oct. 23, 2013. The entire disclosures of all the above applications are hereby incorporated by references herein.

BACKGROUND

Field of Invention

The present invention relates to a method for manufacturing sulfuric acid. More particularly, the present invention relates to a method for manufacturing high purity sulfuric acid.

Description of Related Art

In electronic Industry, such as semiconductor industry, liquid crystal display industry, or solar energy industry, the spent etchant generated after etching substrates includes unconsumed strong acid and base etchant, such as sulfuric acid, and pollutants generated from the etching process for the semiconductor, the glass substrate of liquid crystal display, or solar cells. The spent etchant generated in the above-mentioned industries is often treated as waste, which not only burden the environment heavily, but also does not meet the economic benefits.

In the semiconductor industry process, the wafer-cleaning process is performed with a detergent mixed with at least 96 weight percent of sulfuric acid solution and 30 weight percent hydrogen peroxide according to suitable ratio. Because the wafer-cleaning process operates at a temperature between 80° C. to 120° C., some hydrogen peroxide in the detergent may degrade to water and oxygen.

After the wafer-cleaning process, the water generated from the degradation of the hydrogen peroxide decrease a concentration of the sulfuric acid in the waste sulfuric acid solution in the detergent. Moreover, after the wafer-cleaning process multi times, some substrate in the wafer will etch out and form insoluble impurity in the waste sulfuric acid solution.

The industry is trying to find a way to deal with the waste sulfuric acid solution. However, the cost for treating the waste sulfuric acid solution is too high, and the waste sulfuric acid solution includes too many impurities to recycle to become a high purity sulfuric acid which can meet the requirements of the electronic Industry, such as the semiconductor industry.

Therefore, the industry tried to find a way to manufacture the high purity sulfuric acid from the waste sulfuric acid. The conventional method is applied a distillation process in vacuum or at a reduced pressure (lower than 1 atm). At the reduced pressure in the distillation process, a boiling point of the sulfuric acid will decrease, and a temperature of the distillation process will decrease, so that the distillation process will not completely remove the compound of which a boiling point is lower than the boiling point of the sulfuric acid, thereby hardly obtaining high purity sulfuric acid.

Furthermore, the sulfuric acid gas generated at the boiling point of the sulfuric acid need to be cooled by the condensing device. The high-temperature sulfuric acid gas may etch the material of the condensing device when contacting the condensing device, so that he material of the condensing device may collapse to contaminate the sulfuric acid gas, therefore affect the purity of the generated sulfuric acid.

Seeing that, a method of preparing the high purity sulfuric acid need to be provided to overcome the defect of recycling the waste sulfuric acid.

SUMMARY

Therefore, one aspect of the present disclosure is providing a method for manufacturing a high purity sulfuric acid, which sequentially performs a first preheating step, a second preheating step, a distillation step, and an evaporation step to form a first gas including sulfur trioxide ($SO_3$), sulfuric acid, and water. Then, a sulfuric acid is used to absorb the first gas to form a high purity sulfuric acid. A concentration of the high purity sulfuric acid is at least 96 weight percent, and a molar concentration of an impurity in the high purity sulfuric acid is less than 0.1 ppb molar concentration.

Another aspect of the present disclosure is providing a system for manufacturing a high purity sulfuric acid. The system is heated at 1 atm to form a first gas including sulfur trioxide ($SO_3$), sulfuric acid, and water. A sulfuric acid is used to absorb the first gas to form a high purity sulfuric acid. A concentration of the sulfuric acid is at least 96 weight percent, and a molar concentration of an impurity in the high purity sulfuric acid is less than 0.1 ppb molar concentration.

According to the aforementioned aspect, a method of manufacturing a high purity sulfuric acid is provided. In one embodiment, a mixed solution is firstly provided, which includes a sulfuric acid, a first solution, hydrogen peroxide, water, oxygen, and an insoluble impurity, and a boiling point of the first solution is higher than a boiling point of the sulfuric acid.

Afterwards, the mixed solution is sequentially subjected to a first preheating step, a second preheating step and a distillation step to form a second solution by a gravity flow at 1 atm. The hydrogen peroxide, the water, and the oxygen are removed by the first preheating step, and the water was removed by the second preheating step and the distillation step. A temperature of the first preheating step is lower than a temperature of the second preheating step, and the temperature of the second preheating step is lower than a temperature of the distillation step;

Then, an evaporation step is performed to the second solution at a temperature higher than a boiling point of the sulfuric acid and lower than a boiling point of the first solution to remove the insoluble impurity and the first solution, so as to obtain a first gas. The first gas includes a sulfur trioxide ($SO_3$), sulfuric acid, and water.

And then, a sulfuric acid is used to absorb the first gas to form a high purity sulfuric acid. A concentration of the high purity sulfuric acid is at least 96 weight percent, and a molar concentration of an impurity in the high purity sulfuric acid is less than 0.1 ppb molar concentration.

According to the other aspect of the present embodiment, a system for manufacturing a high purity sulfuric acid is provided. The system includes a feed tank, a first sulfuric acid purifying device, a second sulfuric acid purifying device, and a collection tank.

The aforementioned feed tank is used to store a mixed solution. A feed port is disposed on a top of the feed tank, and a discharging port is disposed on a bottom of the feed tank. The discharging port is connected to a first pipe.

The aforementioned first sulfuric acid purifying device is connected to the feed tank by the first pipe, so that the mixed solution is fed into the first sulfuric acid purifying device.

The first sulfuric acid purifying device includes a first preheating tank, a second preheating tank, and a distillation tower. The first preheating tank is connected to the feed tank by the first pipe. The second preheating tank is connected to the first preheating tank by a second pipe, and the second preheating tank is installed at a first height lower than an installing height of the first preheating tank. The distillation tower is connected to the second preheating tank by a third pipe, and the distillation tower is installed at a second height lower than an installing height of the second preheating tank.

The above-mentioned second sulfuric acid purifying device is connected to the distillation tower by a fourth pipe, and the second sulfuric acid purifying device is installed at a third height lower than an installing height of the distillation tower. The second sulfuric acid purifying device includes an evaporator tower and an absorption tower. The evaporator tower is connected to the distillation tower by the fourth pipe, so that the first solution is subjected to an evaporation step to form a first gas. The first gas includes sulfur trioxide ($SO_3$), sulfuric acid, and water. The absorption tower is connected to the evaporation tower by a fifth pipe. The absorption tower includes an absorbent, and the absorbent is sulfuric acid which is used to absorb the first gas, so as to form a high purity sulfuric acid. The concentration of the high purity sulfuric acid is at least 96 weight percent, and the molar concentration of an impurity in the high purity sulfuric acid is less than 0.1 ppb molar concentration.

The above-mentioned collection tank is connected to the absorption tower by a sixth pipe to collect the high purity sulfuric acid.

The method for manufacturing the high purity sulfuric acid is heated at 1 atm to obtain the first gas which includes $SO_3$, sulfuric acid, and water, and a sulfuric acid is used to absorb the first gas, so as to form a high purity sulfuric acid. Applying the method can not only decrease the waste discharge, reduce the cost for treating the waste sulfuric acid, but also the purified high purity sulfuric acid solution can reuse in the semiconductor industry or other industrial process.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
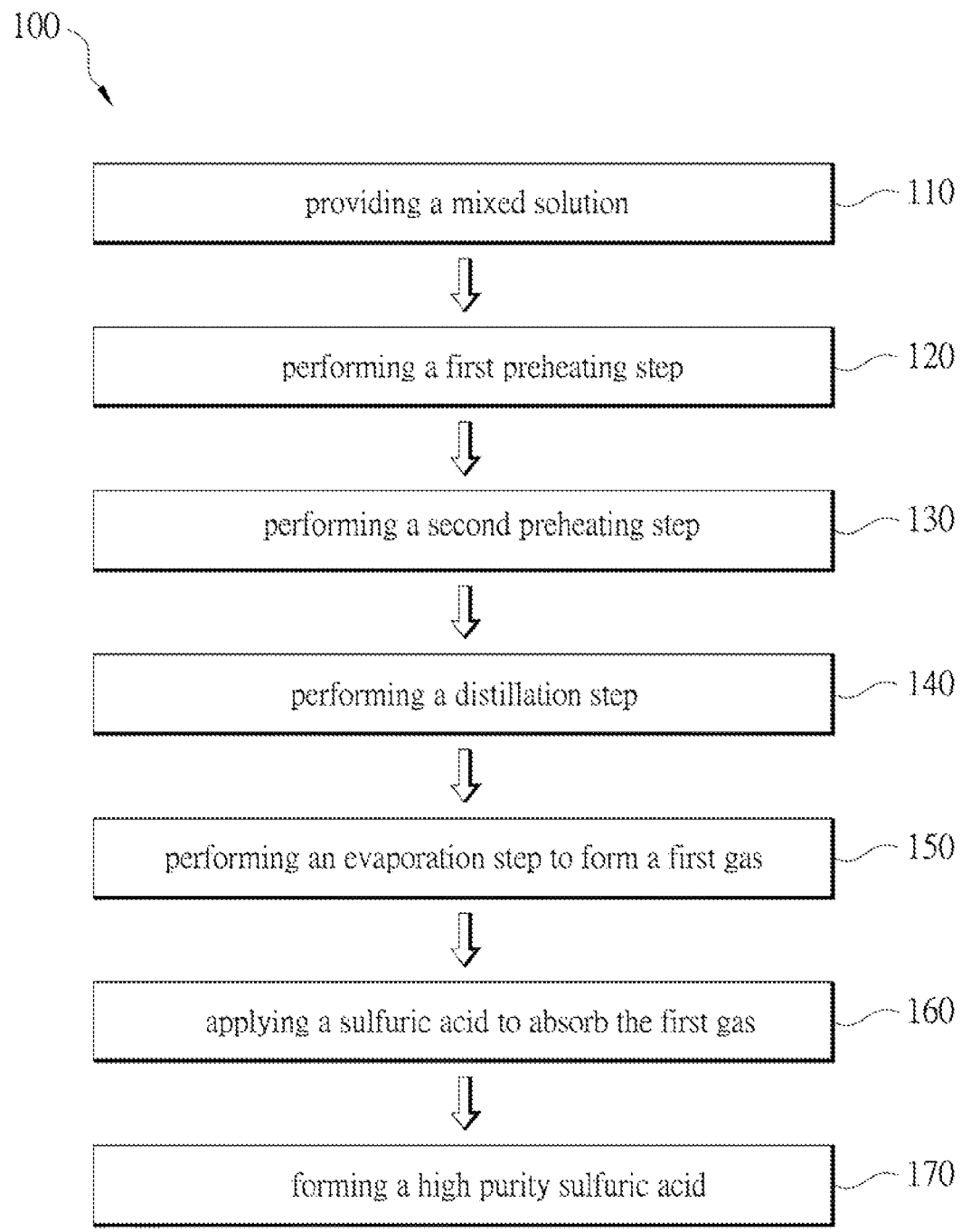
FIG. 1 is a process flow diagram of a high purity sulfuric acid manufacturing method according to one embodiment.

Reference will now be made in detail to the present embodiments of the invention, examples of which are illustrated in the accompanying drawings. Wherever possible, the same reference numbers are used in the drawings and the description to refer to the same or like parts.

As above mentioned, the present invention provides a method for manufacturing a high purity sulfuric acid, which is heated at 1 atm to obtain a first gas including sulfur trioxide ($SO_3$), sulfuric acid, and water, and a sulfuric acid is used to absorb the first gas, so as to form a high purity sulfuric acid, of which a concentration is at least 96 weight percent. The following description incorporate with FIG. 1 describe the method for manufacturing a high purity sulfuric acid Method for Manufacturing a High Purity Sulfuric Acid Referring to FIG. 1, which is a process flow diagram of a high purity sulfuric acid manufacturing method according to one embodiment.

1. Providing a Mixed Solution

First, as shown in step 110, a mixed solution is provided. The mixed solution includes sulfuric acid, a first solution, hydrogen peroxide, water, oxygen gas, and an insoluble impurity, and a boiling point of the first solution is higher than a boiling point of the sulfuric acid.

In one embodiment, the above-mentioned mixed solution is selected form the waste sulfuric acid generated from the semiconductor process. In one example, the above-mentioned mixed solution is selected from the waste cleaning solution after the wafer-cleaning process has been performed. The waste cleaning solution includes 60 weight percent of sulfuric acid. In another example, the mixed solution is selected from the spent substrate etchant from the electronic industry, such as semiconductor industry, liquid crystal display industry, and solar cells industry.

In one embodiment, the above-mentioned mixed solution can selectively include catalyst to degrade the hydrogen peroxide, thereby increasing the concentration of the sulfuric acid in the mixed solution, further decreasing the energy cost and the time cost of the subsequent purification process. The catalyst can bear the acid corrosion in the mixed solution. For example, the catalyst is metal platinum catalyst, metal nickel catalyst, metal zirconium catalyst, any suitable catalyst or a combination thereof.

When the above-mentioned mixed solution includes the catalyst, hydrogen peroxide is degraded to oxygen gas by the catalyst. The generated oxygen gas needs to be discharged by a degassing device to avoid pressure increasing, so as to prevent the sulfuric acid purification process from the pressure.

2. Performing a First Sulfuric Acid Purification Process

Then, the above-mentioned mixed solution is sequentially subjected to a first preheating step, a second preheating step and a distillation step by a gravity flow at 1 atm to remove the substances with boiling points lower than a boiling point of the sulfuric acid, so as to form a second solution. A temperature of the first preheating step is lower than a temperature of the second preheating step, and the temperature of the second preheating step is lower than a temperature of the distillation step;

2.1 Performing a First Preheating Step

As shown in step 120, performing a first preheating step is heated the mixed solution to at least 120° C. at 1 atm. The step not only degrades the hydrogen peroxide to water and oxygen, but also removes the hydrogen peroxide, the water, and the oxygen in the mixed solution.

In one embodiment, if the mixed solution does not include catalyst before the first sulfuric acid purification process is performed, the above-mentioned first preheating step can selectively include a step of adding the catalyst into the mixed solution in order to degrade the hydrogen peroxide, thereby increasing the concentration of the sulfuric acid in the mixed solution. The catalyst can bear the acid corrosion in the mixed solution, and can effectively degrade hydrogen peroxide at a high environmental temperature, which is the temperature of the first preheating step. For example, the catalyst is metal platinum catalyst, metal nickel catalyst, metal zirconium catalyst, any suitable catalyst or a combination thereof.

In one example, when the catalyst is added into the mixed solution at 120° C., after 1 minute, the residual concentration of the hydrogen peroxide is 9.7% and the concentration of the sulfuric acid is 67%.

If the mixed solution did not include the catalysts, when the first preheating step is performed at 120° C., after 15 minutes, the residual concentration of the hydrogen peroxide is 60% and the concentration of the sulfuric acid is 67.58%

2.2 Performing a Second Preheating Step

Then, as shown in step 130, the mixed solution which has been subjected to the first preheating step is subjected to the second preheating step. The mixed solution is heated to a temperature between 160° C. and 200° C. at 1 atm to remove the water in the mixed solution, so as to form a third solution. The third solution includes sulfuric acid of which a concentration is 60 weight percent to 80 weight percent.

In one embodiment, when the mixed solution in the previous steps does not include the catalyst, the above-mentioned second preheating step can selectively include a step of adding the catalyst into the mixed solution to further degrade the residual hydrogen peroxide in the mixed solution, thus increasing a concentration of the sulfuric acid in the mixed solution, further reducing the time cost and energy cost in the subsequent distillation step.

The catalyst can bear the acid corrosion in the mixed solution, and can effectively degrade the hydrogen peroxide at a high environmental temperature, which is the temperature of the second preheating step. The embodiment of the catalyst is the same as the previous described embodiments, therefore no more repeated.

2.3 Performing a Distillation Step

Then, as shown in step 140, the above-mentioned third solution is subjected to the distillation step. The third solution is heated to a temperature between 340° C. to 350° C. at 1 atm to remove the water in the third solution to form the second solution. The second solution is a mixed solution including 98 weight percent of the sulfuric acid.

3. Performing a Second Sulfuric Acid Purification Process

Subsequently, the second solution is subjected to the second sulfuric acid purification process to remove the substance of which a boiling point is higher than the boiling point of the sulfuric acid. A sulfuric acid is used to absorb a first gas to form a high purity sulfuric acid of which a concentration is at least 96 weight percentage.

3.1 Performing an Evaporation Step

As shown in step 150, the above-mentioned second solution is subjected to the evaporation step. The sulfuric acid in the second solution is evaporated to a first gas, which includes sulfur trioxide ($SO_3$), sulfuric acid, and water. The first gas is collected for following treatment. The first solution of which a boiling point is higher than the boiling point of the sulfuric acid and the insoluble impurities in the second solution are removed.

In one embodiment, the above-mentioned first gas includes 28 weight percent of $SO_3$. In another embodiment, the above-mentioned first gas includes 52 weight percent of sulfuric acid. And in another embodiment, the above-mentioned first gas includes 20 weight percent of water.

In one embodiment, the evaporation step degrades the sulfuric acid to $SO_3$ and water. In one example, the evaporation step is heated to a temperature between 340° C. to 350° C. at 1 atm. In another example, the evaporation step is heated to a temperature between 340° C. to 345° C. at 1 atm. In another example, the evaporation step is heated to a temperature between 345° C. to 350° C. at 1 atm.

In one embodiment, the above-mentioned insoluble impurity is produced from some substances of the wafer in a wafer-cleaning process of a semiconductor process. The aforementioned substances can be heavy metal compound, organic compound and the like, and the substances may be etched out and staid in the waste sulfuric acid.

3.2 Applying a Sulfuric Acid to Absorb the First Gas

Then, as shown in step 160, a sulfuric acid of which a concentration is larger than 96 weight percent is used to absorb the first gas to form a high purity sulfuric acid.

In one embodiment, the concentration of the above-mentioned high purity sulfuric acid is at least 96 weight percent. In one embodiment, the concentration of the above-mentioned high purity sulfuric acid is between 96 weight percent to 98 weight percent.

In one embodiment, the impurity concentration of the above-mentioned high purity sulfuric acid is less than 0.1 parts per billion (ppb) molar concentration. Depending the requirements, the concentration can meet electronic grade quality, for example 200 ppb or other values. In other embodiments, according to the client requirements or different products, the impurity concentration in the above-mentioned high purity sulfuric acid can also be in a range from 0.1 to 100 ppb, from 0.1 to 1 ppb, from 1 to 10 ppb, or from 10 to 100 ppb.

In one embodiment, the above-mentioned impurity is metal impurity. In one example, the above-mentioned impurity can be but not limited to silver, aluminum, gold, barium, beryllium, bismuth, calcium, cadmium, cobalt, chromium, copper, iron, gallium, germanium, mercury, potassium, lithium, magnesium, manganese, molybdenum, sodium, niobium, nickel, lead, antimony, tin, strontium, tantalum, titanium, thallium, vanadium, zinc, zirconium, or any combinations thereof.

Besides, the above-mentioned high purity sulfuric acid can selectively be subjected to a degassing step, to remove an unabsorbed first gas. Then, after the degassing step, a cooling step is further performed, to cool the high purity sulfuric acid.

It is worth mentioning that, the above-mentioned high purity sulfuric acid can further selectively be subjected to a post-treatment process to provide products, such as sulfuric acid or a mixed acid including sulfuric acid, which can meet the industrial process of the semiconductor industry, liquid-crystal industry, solar energy industry and the like. The sulfuric acid or the mixed acid including sulfuric acid can produce in a conventional process, which is well understood for people known in the art, therefore no more description here.

System for Manufacturing the High Purity Sulfuric Acid

Figure 2:
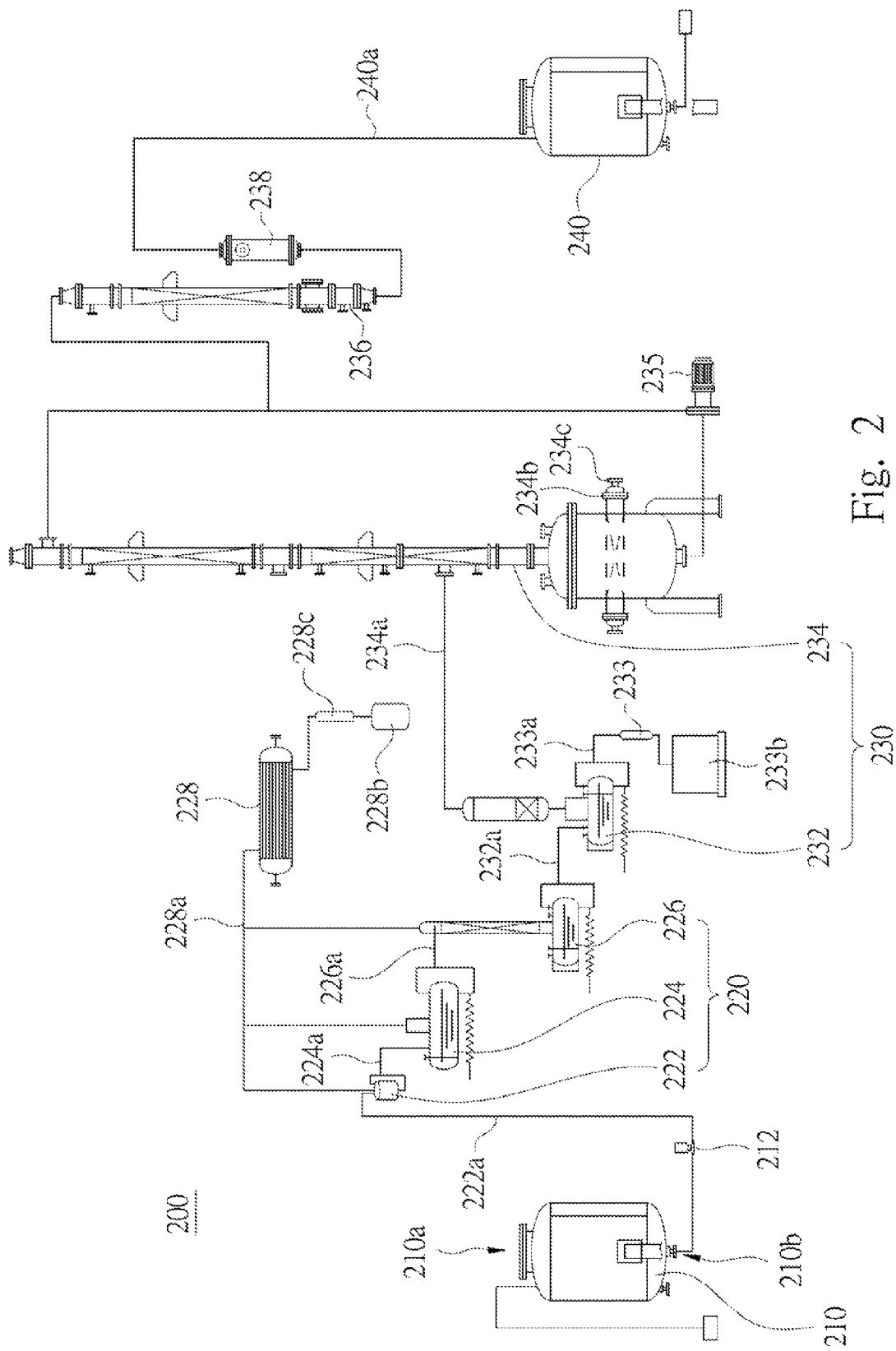
FIG. 2 is a schematic diagram of a system for manufacturing the high purity sulfuric acid according to one embodiment of this invention.

In one embodiment, the above-mentioned method for manufacturing the high purity sulfuric acid may operate in a conventional reacting system or in the reacting system 200 depicted in FIG. 2. Following description are embodiments according to the system 200 for manufacturing the high purity sulfuric acid in FIG. 2.

Referring to FIG. 2, FIG. 2 is a schematic diagram of a system for manufacturing the high purity sulfuric acid according to one embodiment of this invention.

The "mixed solution" in the embodiment of the present invention mainly is the waste sulfuric acid generated after the wafer-cleaning process, or a spent substrate etchant generated after etching substrates in electronic Industry, such as semiconductor industry, liquid crystal display industry, or solar energy industry. The spent etchant includes sulfuric acid, hydrogen peroxide, water, oxygen, and insoluble impurity.

In one embodiment, the reacting system 200 may include a feed tank 210, a first sulfuric acid purifying device 220, a second sulfuric acid purifying device 230 and a collecting tank 240.

In one embodiment, the above-mentioned feed tank 210 is used to store the mixed solution. A feed port 210a is disposed on a top of the feed tank 210, and a discharging port 210b is disposed on a bottom of the feed tank 210. The discharging port 201b is connected with a first pipe 222a.

In one embodiment, the above-mentioned mixed solution in the feed tank 210 may selectively include the catalyst. When the catalyst is added into the above-mentioned mixed solution, the feed tank 210 needs to connect with a degassing device (not shown) to discharge the oxygen generated from the hydrogen peroxide degraded by the catalyst, thereby avoiding a pressure variation, thus preventing an efficiency of sulfuric acid purification process from the pressure variation.

In one embodiment, the above-mentioned catalyst can bear the acid corrosion in the mixed solution. For example, the catalyst is metal platinum catalyst, metal nickel catalyst, metal zirconium catalyst, any suitable catalyst or a combination thereof.

In one embodiment, an other pipe is connected to the feed tank 210 to let the mixed solution feed into the feed tank 210. In another embodiment, the feed tank 210 includes a stirring equipment (not shown). In another embodiment, the discharging port 210b is installed on the bottom of the feed tank 210, for example, on middle of the bottom or on a side of the bottom, so as to discharge the mixed solution easily.

In one embodiment, the above-mentioned first sulfuric acid purifying device 220 is connected to the feed tank 210 by the first pipe 222a, so that the mixed solution is fed into the first sulfuric acid purifying device 220. In one example, a discharge pump 212 is installed between the feed tank 210 and the first sulfuric acid purifying device 220, so that the mixed solution is fed into the first sulfuric acid purifying device 220. In another example, the discharge pump 212 can control the feed velocity of the mixed solution.

In one embodiment, the above-mentioned first sulfuric acid purifying device 220 includes a first preheating tank 222, a second preheating tank 224, and a distillation tower 226. The height of the first sulfuric acid purifying device 220 from high to low sequentially is the first preheating tank 222, the second preheating tank 224, and the distillation tower 226, so that the mixed solution is passed through the first sulfuric acid purifying device 220 by a gravity flow. A temperature of the first preheating tank 222 is lower than a temperature of the second preheating tank 224, and the temperature of the second preheating tank 224 is lower than a temperature of the distillation tower 226.

In one embodiment, a material of the first preheating tank 222, the second preheating tank 224, and the distillation tower 226 includes but is not limited to borosilicate glass, synthetic quartz, and a combination thereof.

In one embodiment, the above-mentioned first preheating tank 222 is connected to the feed tank 210 by the first pipe 222a. In one example, the temperature of the first preheating tank 222 is higher than 120° C. to remove the hydrogen peroxide, water, and oxygen.

In one embodiment, when the catalyst is not added into the mixed solution in the feed tank 210, the mixed solution in the first preheating tank 222 may selectively include the catalyst to degrade the hydrogen peroxide, thereby increasing the concentration of the sulfuric acid in the mixed solution, further decreasing the energy cost and time cost of the purify process.

The catalyst in the mixed solution in the above-mentioned first preheating tank 222 can bear the acid corrosion in the mixed solution, and can effectively degrade hydrogen peroxide at a high temperature environment, which is the temperature of the first preheating step. The embodiments of the catalyst, for example, are metal platinum catalyst, metal nickel catalyst, metal zirconium catalyst, any suitable catalyst or a combination thereof.

In one embodiment, when the catalyst is added into the mixed solution in the first preheating tank 222 at 120° C., after 1 minute, the residual concentration of the hydrogen peroxide is 9.7% and the concentration of the sulfuric acid is 67%.

If the mixed solution in the above-mentioned first preheating tank 222 did not include the catalyst at 120° C., after 15 minutes, the residual concentration of the hydrogen peroxide in the mixed solution is 60% and the concentration of the sulfuric acid is 67.58%.

In one embodiment, the above-mentioned second preheating tank 224 is connected to the first preheating tank 222 by a second pipe 224a, and the second preheating tank 224 is installed at a first height lower than an installing height of the first preheating tank. In one embodiment, a temperature of the second preheating tank 224 is between 160° C. and 200° C. to remove the water and form a third solution. The third solution includes sulfuric acid of which a concentration is between 60 weight percent to 80 weight percent.

In one embodiment, when the mixed solution in the above-mentioned feed tank 210 or the first preheating tank 222 did not include the catalyst, the mixed solution in the second preheating tank 224 can selectively include the catalyst, to further degrade the hydrogen in the mixed solution and increase the concentration of the sulfuric acid.

The catalyst added in the mixed solution in the above-mentioned second preheating tank 224 can bear the acid corrosion in the mixed solution, and can effectively degrade hydrogen peroxide at a high temperature environment, which is the temperature of the second preheating step. The embodiment of the catalyst is the same as the previous described embodiments, therefore no more repeated.

In one embodiment, the above-mentioned distillation tower 226 is connected to the second preheating tank 224 by a third pipe 226a, and the distillation tower 226 is installed at a second height lower than an installing height of the second preheating tank 224. In one example, a temperature of the distillation tower is between 340° C. and 350° C. to remove the water, so as to form a second solution. The second solution is a mixed solution including 98 weight percent concentration of the sulfuric acid.

In one embodiment, the above-mentioned first sulfuric acid purifying device 220 further includes a cooling device 228. The cooling device 228 is connected to the first preheating tank 222, the second preheating tank 224, and the distillation tower 226 by a seventh pipe 228a to collect the waste gas discharged form the first preheating tank 222, second preheating tank 224, and the distillation tower 226. The waste gas includes, for example, hydrogen peroxide, water, oxygen, and substance of which a boiling point is lower than a boiling point of the acid. In one embodiment, the above-mentioned cooling device 228 may include a second cooler 228c and a first waste liquid tank 228b. The second cooler 228c is used to cool the waste gas to form the waste liquid, and the waste liquid is stored in the first waste liquid tank 228b.

In one embodiment, the above-mentioned second sulfuric acid purifying device 230 is connected to the distillation tower 226 by a fourth pipe 232a, and the second sulfuric acid purifying device 230 is installed at a third height lower than an installing height of the distillation tower 226. The second sulfuric acid purifying device 230 includes an evaporator tower 232 and an absorption tower 234.

In one embodiment, the above-mentioned evaporator tower 232 is heated to partially degrade the sulfuric acid into sulfur trioxide and water, thereby removing the insoluble impurity and the first solution of which the boiling point is higher than the boiling point of the sulfuric acid in the mixed solution. In one embodiment, the above-mentioned evaporator tower 232 is heated to the temperature in a range from about 340° C. to about 350° C. at 1 atm. In another embodiment, the above-mentioned evaporator tower 232 is heated to the temperature in a range from about 340° C. to about 345° C. at 1 atm. In another embodiment, the above-mentioned evaporator tower 232 is heated to the temperature in a range from about 345° C. to about 350° C. at 1 atm.

In one embodiment, the above-mentioned evaporator tower 232 is connected to the distillation tower 226 by a fourth pipe 232a. An evaporation step is performed to the first solution to form a first gas, and the first gas includes $SO_3$, sulfuric acid, and water.

In one embodiment, the above-mentioned evaporator tower 232 may include a third cooler 233. The third cooler 233 is connected to the evaporator tower 232 by the eighth pipe 233a to collect the residual liquid in the evaporator tower 232 including an insoluble impurity and the first liquid. In one embodiment, the above-mentioned third cooler 233 may include a second waste liquid tank 233b to store the above-mentioned insoluble impurity and the first liquid.

In one embodiment, the above-mentioned absorption tower 234 is connected to the evaporator tower 232 by a fifth pipe 234a. The absorption tower 234 includes an absorbent. The absorbent is a sulfuric acid of which a concentration is higher than 96 weight percent, and the absorbent is used to absorb the first gas and form a high purity sulfuric acid. The concentration of the high purity sulfuric acid is at least 96 weight percent. In one example, the concentration of the high purity sulfuric acid is in a range from about 96 weight percent to about 98 weight percent.

In one embodiment, a material of the above-mentioned absorption tower 234 includes but is not limited to Teflon.

In one embodiment, the above-mentioned absorption tower 234 further includes a recirculating pump 235, a heat exchanger 234b, and a concentration controller 234c. In one example, the above-mentioned recirculating pump 235 is used to propel the sulfuric acid in the absorption tower 234 flowing, so as to absorb the first gas. In another example, the heat exchanger 234b is used to control the temperature of the absorption tower 234 to avoid the temperature in the absorption tower 234 getting too high. In another example, the concentration controller 234c is used to control the liquid level of the sulfuric acid in the absorption tower 234. And the concentration controller 234c can control the concentration of the high purity sulfuric acid by inputting pure water depending on the requirement of client or different products.

In one embodiment, the above-mentioned collecting tank 240 is connected to the absorption tower 234 by a sixth pipe 240a to collect the high purity sulfuric acid.

In one embodiment, a degassing tower 236 is further connected between the absorption tower 234 and the collecting tank 240 to remove the non-absorbed first gas. In one embodiment, a first cooler 238 is connected between the degassing tower 236 and the collecting tank 240 to cool the high purity sulfuric acid.

To sum up, the method for manufacturing the high purity sulfuric acid and the manufactured high purity sulfuric acid in the percent invention meet the electronic grade quality, and the high purity sulfuric acid can be subjected to a post-treatment process to provide products, such as sulfuric acid or a mixed acid including sulfuric acid, which can meet the industrial process of the semiconductor industry, liquid-crystal industry, solar energy industry and the like.

What need to supply here is, even though the present invention use the specific compound; specific process, specific reaction conditions, specific application or specific devices as embodiments to describe the method for manufacturing the high purity sulfuric acid and the system for manufacturing the high purity sulfuric acid. It will be apparent to those skilled in the art that various modifications and variations can be made to the structure of the present invention without departing from the scope or spirit of the invention. The method for manufacturing the high purity sulfuric acid in the present invention can also be implemented with other compound, process, reaction conditions, application or the equivalent devices.

In conclusion, according to the above-mentioned embodiments, in the method for manufacturing the high purity sulfuric acid, the mixed solution is heated to obtain the first gas including $SO_3$, sulfuric acid, and water at 1 atm, and a sulfuric acid is used to absorb the first gas to form the high purity sulfuric acid. The method cannot only reduce the waste liquid, but also largely lowering the treating cost of waste sulfuric acid. The purified high purity sulfuric acid can reuse in the semiconductor industry and other industrial process.

Further, before the distillation process is performed, the mixed solution in the present invention can selectively include the catalyst to degrade hydrogen peroxide, thereby increasing the concentration of the sulfuric acid in the mixed solution, further reducing the energy cost and time cost for the subsequent purification process.

Although the present invention has been described in considerable detail with reference to certain embodiments thereof, other embodiments are possible. Therefore, the spirit and scope of the appended claims should not be limited to the description of the embodiments contained herein. In view of the foregoing, it is intended that the present invention cover modifications and variations of this invention provided they fall within the scope of the following claims.

What is claimed is:

1. A method for manufacturing a high purity sulfuric acid, comprising:
providing a mixed solution, wherein the mixed solution comprises sulfuric acid, a first solution, hydrogen peroxide, water, oxygen gas, and an insoluble impurity, and a boiling point of the first solution is higher than a boiling point of the sulfuric acid;
performing sequentially a first preheating step, a second preheating step and a distillation step to the mixed solution to form a second solution, all of the first preheating step, the second preheating step and the distillation step are carried out by a gravity flow at 1 atm, wherein the hydrogen peroxide, a portion of the water, and the oxygen are removed by the first preheating step, an additional portion of the water is removed by the second preheating step and a remaining portion of the water is removed by the distillation step, a temperature of the first preheating step is lower than a temperature of the second preheating step, the temperature of the second preheating step is lower than a temperature of the distillation step, and the second preheating step comprises adding a catalyst into the mixed solution;

performing an evaporation step to the second solution in a range from 340° C. to 350° C. at 1 atm to remove the insoluble impurity and the first solution, thereby obtaining a first gas, wherein the sulfuric acid of the second solution is partially degraded into water and sulfur trioxide ($SO_3$) during the evaporation step, and the first gas comprises the $SO_3$, sulfuric acid, and water; and applying a sulfuric acid to absorb the first gas to form a high purity sulfuric acid, wherein a concentration of the sulfuric acid is larger than 96 weight percent, a concentration of the high purity sulfuric acid is at least 96 weight percent, and a molar concentration of an impurity in the high purity sulfuric acid is less than 0.1 ppb molar concentration, wherein the impurity includes silver, aluminum, gold, barium, beryllium, bismuth, calcium, cadmium, cobalt, chromium, copper, iron, gallium, germanium, mercury, potassium, lithium, magnesium, manganese, molybdenum, sodium, niobium, nickel, lead, antimony, tin, strontium, tantalum, titanium, thallium, vanadium, zinc and/or zirconium.

2. The method of claim 1, wherein the temperature of the first preheating step is higher than 120° C., the temperature of the second preheating step is in a range from 160° C. to 200° C., and the temperature of the distillation step is in a range from 340° C. to 350° C.

3. The method of claim 1, wherein the mixed solution comprises a catalyst.

4. The method of claim 1, wherein the first preheating step comprises adding a catalyst into the mixed solution.

5. The method of claim 1, wherein the concentration of the high purity sulfuric acid is in a range from 96 weight percent to 98 weight percent.

6. The method of claim 1, further comprising a degassing step and a cooling step to remove the unabsorbed first gas after the first gas is absorbed by the sulfuric acid and cool the high purity sulfuric acid after the degassing step.

* * * * *